US008372912B2

(12) United States Patent
Olsen et al.

(10) Patent No.: US 8,372,912 B2
(45) Date of Patent: Feb. 12, 2013

(54) POLYVINYL CHLORIDE COMPOSITIONS

(75) Inventors: David Justin Olsen, Kingsport, TN (US); Martin James Stimpson, The Cedars Kent (GB)

(73) Assignee: Eastman Chemical Company, Kingsport, TN (US)

(*) Notice: Subject to any disclaimer, the term of this patent is extended or adjusted under 35 U.S.C. 154(b) by 252 days.

(21) Appl. No.: 11/202,543

(22) Filed: Aug. 12, 2005

(65) Prior Publication Data

US 2007/0037926 A1 Feb. 15, 2007

(51) Int. Cl.
*A61L 2/08* (2006.01)

(52) U.S. Cl. .......... 524/569; 524/99; 524/100; 524/102; 524/279; 524/441; 524/567; 525/185

(58) Field of Classification Search .................... 524/99, 524/100, 102, 279, 441, 567, 569; 525/185
See application file for complete search history.

(56) References Cited

U.S. PATENT DOCUMENTS

| | | |
|---|---|---|
| 2,217,163 A | 10/1940 | Fletcher |
| 2,360,306 A | 10/1944 | Nason |
| 2,459,955 A | 1/1949 | Morrison et al. |
| 2,628,207 A | 2/1953 | Smith, Jr. et al. |
| 3,224,995 A | 12/1965 | DePree |
| 3,431,239 A | 3/1969 | Morris et al. |
| 3,725,311 A | 4/1973 | Grubb |
| 3,764,374 A | 10/1973 | Barton et al. |
| 4,015,044 A | 3/1977 | Ranney et al. |
| 4,082,712 A | 4/1978 | Dannels |
| 4,110,261 A | 8/1978 | Newland |
| 4,221,688 A | 9/1980 | Johnson et al. |
| 4,253,898 A | 3/1981 | Rinker et al. |
| 4,331,579 A | 5/1982 | Haemer |
| 4,362,783 A | 12/1982 | Graham |
| 4,366,307 A | 12/1982 | Singh et al. |
| 4,376,144 A | 3/1983 | Goettler |
| 4,401,720 A | 8/1983 | Davis et al. |
| 4,414,267 A | 11/1983 | Coran et al. |
| 4,515,909 A | 5/1985 | Sawano et al. |
| 4,562,173 A | 12/1985 | Terano et al. |
| 4,599,376 A * | 7/1986 | Takimoto et al. ............ 524/441 |
| 4,605,465 A | 8/1986 | Morgan |
| 4,654,390 A | 3/1987 | Siegel |
| 4,666,765 A | 5/1987 | Caldwell et al. |
| 4,764,449 A | 8/1988 | VanIseghem |
| 4,792,464 A | 12/1988 | Martenson |
| 4,806,590 A | 2/1989 | Padget et al. |
| 4,900,771 A | 2/1990 | Gerace et al. |
| 4,975,480 A | 12/1990 | Bullen |
| 5,071,690 A | 12/1991 | Fukuda et al. |
| 5,179,138 A | 1/1993 | Uemura et al. |
| 5,236,883 A | 8/1993 | Nakazawa et al. |
| 5,288,797 A | 2/1994 | Khalil et al. |
| 5,326,845 A | 7/1994 | Linden |
| 5,338,788 A | 8/1994 | Miyataka et al. |
| 5,366,550 A | 11/1994 | Schad |
| 5,401,708 A | 3/1995 | Shimizu et al. |
| 5,454,801 A | 10/1995 | Lauritzen |
| 5,476,889 A | 12/1995 | Owen |
| 5,489,618 A | 2/1996 | Gerkin |
| 5,492,960 A | 2/1996 | Muehlbauer et al. |
| 5,494,707 A | 2/1996 | Wang et al. |
| 5,519,072 A | 5/1996 | Wieczorek, Jr. et al. |
| 5,523,344 A | 6/1996 | Maksymkiw et al. |
| 5,534,609 A | 7/1996 | Lewis et al. |
| 5,535,469 A | 7/1996 | Terry |
| 5,539,011 A | 7/1996 | Hilker et al. |
| 5,559,175 A | 9/1996 | Kroggel et al. |
| 5,571,860 A | 11/1996 | Kukkala et al. |
| 5,659,001 A | 8/1997 | de la Croi Habimana et al. |
| 5,670,225 A | 9/1997 | Yamanaka et al. |
| 5,681,631 A | 10/1997 | Steelman et al. |
| 5,698,621 A * | 12/1997 | Nguyen et al. ................ 524/297 |
| 5,750,278 A | 5/1998 | Gillett et al. |
| 5,869,589 A | 2/1999 | Raynolds et al. |
| 5,877,268 A | 3/1999 | Jorgenson et al. |
| RE36,233 E | 6/1999 | Hilker et al. |
| 5,919,716 A | 7/1999 | Raynolds et al. |
| 6,034,168 A | 3/2000 | Wang |
| 6,127,026 A | 10/2000 | Bonk et al. |
| 6,136,884 A | 10/2000 | Chen et al. |
| 6,136,900 A * | 10/2000 | Kuhn et al. ..................... 524/99 |
| 6,187,125 B1 | 2/2001 | Rustad et al. |
| 6,221,991 B1 | 4/2001 | Letchford et al. |
| 6,231,849 B1 | 5/2001 | Schiller |
| 6,235,830 B1 | 5/2001 | Ohmori et al. |
| 6,245,437 B1 | 6/2001 | Shiiki et al. |
| 6,284,077 B1 | 9/2001 | Lucas et al. |
| 6,299,864 B1 | 10/2001 | Chen et al. |
| 6,303,184 B1 | 10/2001 | Lobo et al. |
| 6,323,275 B2 | 11/2001 | Takahashi et al. |
| 6,391,405 B1 | 5/2002 | Bonk et al. |
| 6,414,044 B2 | 7/2002 | Taylor |
| 6,414,077 B1 | 7/2002 | Barron et al. |
| 6,433,097 B1 | 8/2002 | Nixon et al. |
| 6,437,071 B1 | 8/2002 | Odaka et al. |
| 6,479,584 B1 | 11/2002 | Nakagawa et al. |
| 6,582,786 B1 | 6/2003 | Bonk et al. |
| 6,630,534 B1 | 10/2003 | Tanaka et al. |

(Continued)

FOREIGN PATENT DOCUMENTS

| | | |
|---|---|---|
| CA | 2 485 133 A1 | 11/2003 |
| CA | 2 624 332 A1 | 4/2007 |

(Continued)

OTHER PUBLICATIONS

Koyama et al., Abstract of JP 01-045452A, Feb. 17, 1989.*

(Continued)

*Primary Examiner* — Doris Lee

(74) *Attorney, Agent, or Firm* — William K. McGreevey

(57) ABSTRACT

A polyvinyl chloride composition having polyvinyl chloride resin and a plasticizer ester selected from di-butyl terephthalate, di-isobutyl terephthalate, or mixtures thereof.

17 Claims, No Drawings

U.S. PATENT DOCUMENTS

| | | | |
|---|---|---|---|
| 6,638,992 | B1 | 10/2003 | Chen et al. |
| 6,656,988 | B1 | 12/2003 | Fischer et al. |
| 6,670,419 | B2 | 12/2003 | Lau |
| 6,675,560 | B2 | 1/2004 | Gott et al. |
| 6,706,399 | B1 | 3/2004 | George et al. |
| 6,749,836 | B1 | 6/2004 | Chen et al. |
| 6,749,861 | B2 | 6/2004 | Mullen |
| 6,750,278 | B2 | 6/2004 | Patil et al. |
| 6,762,239 | B1 | 7/2004 | Williams |
| 6,784,240 | B2 | 8/2004 | Hasegawa et al. |
| 6,803,403 | B2 | 10/2004 | Ishihara |
| 6,809,147 | B1 | 10/2004 | Ohno et al. |
| 6,825,278 | B2 | 11/2004 | Holub et al. |
| 6,833,423 | B2 | 12/2004 | Roesler |
| 6,849,675 | B2 | 2/2005 | Sullivan |
| 6,855,765 | B2 | 2/2005 | Chew et al. |
| 6,858,260 | B2 | 2/2005 | Taylor et al. |
| 6,864,317 | B1 | 3/2005 | Kitano et al. |
| 6,872,454 | B2 | 3/2005 | Newberth, III et al. |
| 6,884,840 | B2 | 4/2005 | Gleichenhagen et al. |
| 6,887,964 | B2 | 5/2005 | Frisch |
| 6,896,736 | B2 | 5/2005 | Lee et al. |
| 6,900,265 | B2 | 5/2005 | Schultz et al. |
| 6,933,350 | B1 | 8/2005 | Nakagawa et al. |
| 6,946,509 | B2 | 9/2005 | He |
| 6,958,149 | B2 | 10/2005 | Vukicevic et al. |
| 6,960,619 | B2 | 11/2005 | Figovsky et al. |
| 6,964,999 | B1 | 11/2005 | Nakagawa et al. |
| 6,977,277 | B2 | 12/2005 | Patil et al. |
| 6,979,716 | B1 | 12/2005 | Nakagawa et al. |
| 7,005,095 | B2 | 2/2006 | Haga |
| 7,012,148 | B2 | 3/2006 | Curphey |
| 7,019,068 | B2 | 3/2006 | Bodart et al. |
| 7,208,464 | B2 | 4/2007 | Heltovics et al. |
| 7,361,779 | B1 | 4/2008 | Holt et al. |
| 2003/0074833 | A1 | 4/2003 | Wood et al. |
| 2004/0097625 | A1 | 5/2004 | Bodart et al. |
| 2005/0020718 | A1 | 1/2005 | Gosse et al. |
| 2005/0262758 | A1 | 12/2005 | Allison et al. |
| 2006/0106168 | A1 | 5/2006 | Ota et al. |
| 2006/0276339 | A1 | 12/2006 | Windsor et al. |
| 2007/0012140 | A1 | 1/2007 | Howlett et al. |
| 2007/0012148 | A1 | 1/2007 | Workman et al. |
| 2007/0037926 | A1 | 2/2007 | Olsen et al. |
| 2007/0110791 | A1 | 5/2007 | Myhra |
| 2007/0128148 | A1 | 6/2007 | Whitehead et al. |
| 2007/0172382 | A1 | 7/2007 | Uchiyama et al. |
| 2007/0179229 | A1 | 8/2007 | Grass |
| 2007/0230189 | A1 | 10/2007 | Gruenbacher et al. |
| 2008/0054089 | A1 | 3/2008 | Oldfield et al. |
| 2008/0057317 | A1 | 3/2008 | Kettner et al. |
| 2008/0058450 | A1 | 3/2008 | Stimpson et al. |

FOREIGN PATENT DOCUMENTS

| | | | |
|---|---|---|---|
| CA | 2 595 012 | A1 | 2/2008 |
| CN | 1651229 | A | 8/2005 |
| DE | 44 15 888 | A1 | 11/1994 |
| DE | 100 16 086 | A1 | 10/2000 |
| DE | 102006001795 | A1 | 7/2007 |
| EP | 0 397 245 | A2 | 11/1990 |
| GB | 851 753 | | 10/1960 |
| GB | 985143 | | 3/1965 |
| JP | 55-021446 | | 2/1980 |
| JP | 63-075050 | | 4/1988 |
| JP | 6445452 | A | 2/1989 |
| JP | 05-262942 | | 10/1993 |
| JP | 08 020668 | A | 1/1996 |
| JP | 80020668 | A | 1/1996 |
| JP | 2002-234983 | | 8/2002 |
| JP | 2003-301082 | | 10/2003 |
| JP | 2006 193603 | A | 7/2006 |
| WO | WO 91/17302 | A1 | 11/1991 |
| WO | WO 92/18601 | A1 | 10/1992 |
| WO | 03029339 | A1 | 4/2003 |
| WO | WO 03/029339 | * | 4/2003 |

OTHER PUBLICATIONS

Notification of Transmittal of the International Search Report and the Written Opinion of the International Searching Authority, or the Declaration dated of mailing Dec. 27, 2006 in the corresponding PCT application PCT/US2006/031465.

Hansen, C.M.; "Hansen Solubility Parameters—A User's Handbook"; pp. 9-10, 167-185; CRC Press, Boca Raton, FL.

Herman, Stephen J.; Edited by David Rowe; "Chemistry and Technology of Flavors and Fragrance", "Chapter 13, Applications II: Fragrance"; Blackwell Publishing (2004); pp. 310.

Notification of Transmittal of the International Search Report and Written Opinion of the International Searching Authority, or the Declaration date of mailing Jan. 25, 2008 received in International Application No. PCT/US2007/019060.

Notification of Transmittal of the International Search Report and Written Opinion of the International Searching Authority, or the Declaration date of mailing Jan. 31, 2008 received in International Application No. PCT/US2007/019004.

Notification of Transmittal of the International Search Report and Written Opinion of the International Searching Authority, or the Declaration date of mailing Feb. 26, 2008 received in International Application No. PCT/US2007/019003.

Beeler, A. Don; "Terephthalate Esters a New Class of Plasticizers for Polyvinyl Chloride"; Society of Plastics Engineers; 34$^{th}$ Annual Technical Conference; Chalfonte-Haddon Hall, Atlantic City, New Jersey; Apr. 26-29, 1976.

Office Action with Notification Date of Mar. 29, 2010 for co-pending U.S. Appl. No. 11/846,971.

Office Action with Notification Date of Mar. 31, 2010 for co-pending U.S. Appl. No. 11/846,953.

Office Action with Mail Date of Apr. 9, 2009 for co-pending U.S. Appl. No. 11/846,968.

Office Action with Notification Date of Dec. 3, 2009 for co-pending U.S. Appl. No. 11/846,968.

Science Lab.com, MSDS-Dibutyl-phthalate-9927152 section 1 (Oct. 10, 2005 updated Nov. 6, 2008).

United Nations Environment Programme, Geneva, 1997 Env Health Criteria No. 189, p. 20/129, Section 3.2.2—Di-n-butyl Phthalate.

Vandezande, et al.; "Chapter 16—Vinyl Acetate Polymerization," Emulsion Polymerization and Emulsion Polymers; 1997; pp. 563-587; John Wiley & Sons Ltd.

Daniels, W., "Vinyl Ester Polymers," Kirk-Othmer, Encyclopedia of Chemical Technology, pp. 393-425; vol. 17; John Wiley and Sons, New York.

Office Action received in co-pending U.S. Appl. No. 11/846,953 notification date Dec. 22, 2011.

Ramey, J. S. and Porter, R. A.; "Softening Aid, Flushing Agent, Viscosity Reducer: A Study of Plasticizers for Polyurethanes"; Polyurethane 1995; Sep. 26-29, 1995; pp. 216-223.

* cited by examiner

POLYVINYL CHLORIDE COMPOSITIONS

FIELD OF THE INVENTION

This invention pertains to novel polyvinyl chloride compositions. More particularly, this invention pertains to novel compositions containing an intimate admixture of polyvinyl chloride and an ester plasticizer. More particularly, the present invention pertains to polyvinyl chloride compositions including a plasticizer selected from di-butyl terephthalate, di-isobutyl terephthalate and mixtures thereof.

BACKGROUND OF THE INVENTION

Polyvinyl chloride (commonly referred to as "PVC") has been used for a number of years in the manufacture of soft, flexible films for food packaging, in molded rigid products (such as pipes, fibers, upholstery and bristles), and in a variety of other products, including electric wire and cable-coverings, film finishes for textiles, raincoats, belting, gaskets and shoe soles. A variety of plasticizers have been used to produce flexible PVC articles. The plasticizer compounds differ in many respects but all of them must possess certain characteristics. For example, the plasticizer compound must be compatible with the PVC resin and render the PVC more flexible and/or softer. In PVC, the plasticizer also assists in the fusion of the PVC formulation to produce the final article. In the typical fusion process, the PVC resin particles dissolve and/or break apart, intermingle with all the other additives to produce the final homogenously mixed material. Plasticizers that have a high affinity for PVC resin resulting in very quick fusion are called high-solvating plasticizers. Fusion in dry blends is accomplished by a combination of stress and temperature. Fusion in plastisols occurs mainly by temperature. There are a number of chemical classes of high-solvating plasticizers such as benzoates, butyl benzyl phthalate, dihexyl phthalate, and others. High-solvating plasticizers provide faster fusion allowing fusion to occur at lower temperatures or to occur faster at a given temperature. A disadvantage for plastisols is high solvating plasticizers are typically not as stable to viscosity increases as general purpose plasticizers.

BRIEF SUMMARY IF THE INVENTION

We have found that di-butyl terephthalate(DBTP) and di-isobutyl terephthalate (DIBTP) are high-solvating plasticizers for PVC resins and provide advantages compared to other high solvating plasticizers when incorporated into PVC resins. DBTP-containing PVC compositions have better low temperature properties and exhibits stain resistance equivalent to PVC plasticized with benzoate esters (which are very stain resistant plasticizers) and better than other high solvating plasticizers such as butyl benzyl phthalate At the same time, DBTP-containing plastisols also are lower in viscosity and maintain this difference as the plastisol ages. The present invention thus provides a novel PVC composition comprising a PVC resin containing a plasticizing amount of di-butyl terephthalate, di-isobutyl terephthalate or a mixture thereof. The PVC compositions of the present invention have a variety of uses such as in adhesives and sealants, coated fabrics, wire and cable coatings, foams, footwear, gaskets, inks, cosmetics, and medical devices. PVC-based applications include floor coverings, wallpaper, roofing membranes, tubing, inks, and calendared film.

DETAILED DESCRIPTION

The composition of the present invention comprises a PVC resin and a plasticizer selected from di-butyl terephthalate, di-isobutyl terephthalate or a mixture thereof. As used herein, the term "PVC resin" means homopolymers of polyvinyl chloride resin(s), copolymers of polyvinyl chloride resin(s), and mixtures thereof. Copolymers of vinyl chloride are formed by the copolymerization of vinyl chloride and other monomers or monomer blends. Suitable monomers include vinyl acetate, ethylene, propylene, maleate, methacrylate, acrylate, high alcohol vinyl ester, urethane, chlorinated urethane, methylmethacrylate, and mixtures thereof. Examples of monomer blends include ethylene-vinyl acetate copolymer, acrylonitrile-butadiene-styrene terpolymer, acrylonitrile-butadiene copolymer, and mixtures thereof. The monomers or monomer blends may be present in an amount of up to 10 parts per hundred parts resin (the term "parts per hundred parts resin" is used herein to define the quantity of the components based on the weight of the resin and is abbreviated "PHR").

The PVC resin component of the present invention has a degree of polymerization (DP) which is between 650 and 1600, preferably between 900 and 1100, and an inherent viscosity (IV) between 0.5 and 1.4 (based on ASTM D-1243). The PVC-based resin of the present invention may be formulated from a single PVC resin or a mixture of two or more different PVC resins. When two or more different PVC resins are used, the PVC resins preferably have degrees of polymerization which are relatively close in value.

The di-butyl and/or di-isobutyl terephthalate plasticizer compounds may be used alone, together or they may be used in combination with additional plasticizers in the PVC composition. Examples of such additional plasticizers include, but are not limited to, dioctyl phthalate, di-2-ethyl hexyl phthalate, diisooctyl phthalate, diisononyl phthalate, di-linear nonyl phthalate, di-linear nonyl, undecyl phthalate, di-linear undecyl phthalate, diundecyl phthalate, diisodecylpthalate, $C_6$-$C_{10}$ straight-chain phthalates, $C_7$ linear phthalate, $C_9$ linear phthalate, $C_{11}$ linear phthalate, ditridecyl phthalate, undecyl dodecyl phthalate, di(2-propylheptyl phthalate), nonylundecyl phthalate, texanolbenzylphthalate, polyester phthalate, diallylphthalate, n-butylphthalyl-n-butyl glycosate, dicaprylphthalate, butylcyclohexyl phthalate, dicyclohexyl phthalate, butyl octyl phthalate, dioctyl terephthalate, di-2-ethyl hexyl terephthalate, dioctyl adipate, di-2-ethyl hexyl adipate, diisonyl adipate, diisooctyl adipate, diisodecyl adipate, di tridecyl adipate, dibutoxyethyl adipate, dibutoxyethoxy adipate, di(noctyl, ndecyl)adipate, polyester adipate, poly glycol adipates, trioctyl trimellitate, tri-2-ethyl hexyl trimellitate, triisooctyl trimellitate, tri isononyl trimellitate, triisodecyl trimellitate, tri-n-hexyl trimellitate, dioctyl azelate, di-2-ethylhexyl glutarate, di-2-ethyl hexyl sebecate, dibutyl sebecate, dibutoxyethyl sebecate, triethyl citrate, acetyl triethyl citrate, tri-n-butyl citrate, acetytri-n-butyl citrate, acetyltri-n-hexyl citrate, n-butyl tri-n-hexyl citrate, isononyl benzoate, isodecyl benzoate, 1,4 cyclohexane dimethanol dibenzoate, 2,2,4 trimethyl-1,3 pentane diol dibenzoate, 2,2,-dimethyl-1,3 propanediol dibenzoate, $C_{10}$-$C_{21}$ alkane phenol esters or alkyl sulphonic phenol ester, acetic acid reaction products with fully hardened castor oil, pentaerythritol tetrabenzoate, glycerol tribenzoate, polypropylene glycol dibenzoate, triarylphosphates, diisononyl cyclohexane 1,2 dicarboxylate, polymers of adipic acid/phthalates/adipates/sebecates/with glycols and often acid terminated, butyl benzyl phthalate, alkylbenzyl phthalate, $C_7$-$C_9$ butyl phthalate, diethylene glycol dibenzoate, di propylene glycol dibenzoate, 2-ethylhexyl benzoate, texanolbenzoate, ethylene glycol dibenzoate, propylene glycol dibenzoate, triethylene glycol dibenzoate, di-heptyl phthalate, dihexyl phthalate, dimethyl phthalate, diethyl phthalate, dibutyl phthalate, diisobutyl phthalate, and mixtures thereof. The plasticizer or plasticizers are present in the compositions of the present invention in amounts ranging from about 20 to 800 PHR, more typically about 40 to 120 PHR, and most preferably from about 40 to 80 PHR. Di-butyl terephthalate and/or di-isobutyl terephthalate constitute from about 10 to 100 weight percent, preferably about 25 to 100 weight percent of the total plasticizer present in the compositions.

The compositions of the present invention may contain one or more stabilizers such as metal soaps, organic phosphites, epoxy compounds, tin stabilizers, and mixtures thereof. The stabilizers provide protection against deficient PVC homopolymerization and copolymerization, and functions to eliminate or retard the process of polymer degradation. The total amount of stabilizer present in the compositions ranges from 0.1 to 10 PHR, preferably from 1 to 7 PHR, and most preferably 2 to 5 PHR. Preferably, the stabilizer is a mixture of metal soaps and epoxy compounds, or a mixture of metal soaps, epoxy compounds and organic phosphites.

Metal soap stabilizers include zinc stearate, barium stearate, calcium stearate, cadmium stearate, barium ricinolate, calcium oleate, calcium laurelate, zinc octoate, and mixtures thereof. Preferably, the metal soap stabilizers are mixtures of barium stearate, zinc stearate and cadmium stearate. A preferred barium stearate/zinc stearate mixture is sold by Bearlocher (Chemgrade UBZ-791), and preferred calcium stearate/zinc stearate and barium stearate/cadmium stearate mixtures are sold by Azko Interstab. (CZ-19A and BC-103L, respectively). Epoxy compound stabilizers include epoxy soybean oil, e.g., Srapex 6.8, ESO, epoxy linseed oil, epoxy polybutadiene, epoxy methylstearate, epoxy stearate, epoxy ethylhexyl stearate, epoxy stearyl stearate, epoxy propyl isocyanalate 3-(2-case INO)-1,2-epoxy propane, bis-phenol A diglycidyl ether, vinyl dicyclohexanediepoxide, 2,2-bis-(4-hydroxyphenol) propane and epichlorohydrine condensation copolymeration, and mixtures thereof. Organic phosphite stabilizers include diphenyldecyl phosphite, triphenyl phosphite, tris-nonylphenyl phosphite, tri-steareal phosphite, octyldiphenyl phosphite, and mixtures thereof. Tin stabilizers include tin dilaurate, dibutyl tin maleate, organic tin mercaptide and organic tin sulfonic amide, and mixtures thereof.

The above stabilizers may be used individually or in any combination. Preferably, the stabilizers are mixtures of zinc stearate, barium stearate, calcium stearate, and epoxy compounds. A preferred epoxy stabilizer is epoxy soybean oil. In addition, organic phosphites may be used in conjunction with the zinc stearate, barium stearate, cadmium stearate, and epoxy compound mixtures. Particularly preferred stabilizer mixtures are barium stearate/zinc stearate and epoxy soybean oil, calcium stearate/zinc stearate and epoxy soybean oil, and barium stearate/cadmium stearate and epoxy soybean oil.

In addition to PVC or a PVC-based resin, the di-butyl and/or di-isobutyl terephthalate plasticizer compounds primary plasticizer(s) and optional stabilizer(s), the compositions of the present invention may include additional additives, such as anti-static agents, anti-fogging agents, ultraviolet inhibitors, anti-oxidants, light stabilizers, fire retardants, pigments, and mixtures thereof. These additives are generally known in the art and may be present in the compositions in an amount sufficient to impart the desired property (generally below 10 PHR). Anti-static and anti-fogging agents include sorbitan fatty ester, sorbitol fatty ester, glycerine fatty Di-butyl terephthalate (DBTP) and di-isobutyl terephthalate (DIBTP) have been found to be high solvating plasticizers for PVC and PVC-based polymeric materials. High solvating plasticizers such as butyl benzyl phthalate fuse at a faster rate/lower temperature than do general purpose plasticizers such as di(2-ethylhexyl) phthalate (DOP) and di(isononyl) phthalate (DINP). Plastisols are dispersions of certain polyvinyl chloride resins of very small to medium particle size, e.g., average particle size of about 1 to 100 microns, in liquid plasticizers. Dry plasticized PVC compositions typically are prepared for PVC resins having large particle size, e.g., average particle size of about 100 to 400 microns. Viscosity is an important property for the processing of plastisol PVC compositions. The application often dictates the absolute value. Excessively high viscosity can cause problems pumping and filling mold features. Too low viscosity may result in material run off and give parts or articles that are too thin. Viscosity stability also is important because if the viscosity increases too fast, the time for using the plastisol may be insufficient. Problems resulting from high viscosity in plastisols include poor filling of molds, difficulty in coating to given thicknesses, inability to pump the plastisol, and eventually premature gelling of the composition. When parts are made on a volume basis, lower density is advantageous since more parts per weight of PVC may be produced.

Plastisol formulations of our novel compositions may be prepared by mixing the liquid ingredients together using a high intensity mixer, e.g., a Cowles mixer, or a low intensity mixer, e.g., a Hobart mixer. The PVC resin and other solid ingredients are added over a short time period with mixing in either a high or low intensity mixers and the resultant dispersion often is deaerated under vacuum or other conditions. The plastisol then may be fused under a number of different heat conditions such as knife coated to a certain thickness and fused in an oven at varying temperature, in heated molds, in cold molds that are subsequently heated, and similar methods. Once fused, physical properties of the plastisol may be determined.

Dry formulations of the PVC compositions may be prepared by combining the solid ingredients and mixing them in a Henschel mixer. The liquid ingredients then are slowly added. The mixture is blended until a temperature of about 88° C. is reached, at which temperature PVC is below its fusion temperature. This procedure produced a free-flowing powder of PVC particles having the other ingredients absorbed therein. The free-flowing powder then may be fused on a 2 roll mill at a temperature of about 140 to 150° C. to produce a fused PVC sheet.

EXAMPLES

The preparation and properties of the compositions provided by the present invention are further illustrated by the following examples 1-3. The compositions of the following examples were prepared by mixing the liquid ingredients together using a high intensity mixer, e.g., a Cowles mixer, or a low intensity mixer, e.g., a Hobart mixer and mixed sufficiently to produce a substantially homogeneous mixture. The PVC resin and other solid ingredients are added over a short time period with mixing in either a high or low intensity mixers and the resultant dispersion often is deaerated under vacuum or other conditions. The plastisol was placed in a 1778 micron (70 mil) mold and fused in an oven at 175 to 190° C. and test bars were cut from the fused sheets.

Modulus of elasticity and the tensile strength are measured according to ASTM D142. Fusion was done using ASTM D 2538 (fusion properties and gel properties are determined with this test). The elongation, modulus of elasticity and the tensile strength are measured according to ASTM D412. The tear resistance was measured according to ASTM D624, and the brittleness temperature was measured according to ASTM D746. Brookfield viscosity (centipoises) was determined according to ASTM D1824, typically at ambient temperature or 25° C. Unless specified otherwise, spindle #5 was used in the Brookfield viscosity measurements. Tear resistance was measured according to ASTM D624, brittleness temperature was measured according to ASTM D746, chemical extractions were D1239, carbon extraction D1203, specific gravity D792, and shore A hardness D2240.

Example 1 and Comparative Example C-1

Using the above-described procedure, two compositions were prepared from PVC (Oxy 75HC resin supplied by Oxychem), 70 PHR plasticizer, 2 PHR epoxidized soybean oil (Drapex 6.8 supplied by Crompton-Witco) and 2 PHR of a mixed metal stabilizer (Akcrostab LT 4798 supplied by Akros Chemicals). In the first composition, the plasticizer was a 75:25 by weight blend of dioctal terephthalate (DOTP) and DBTP (Example 1). In the second composition, the plasticizer was a 75:25 by weight blend of DOTP and diethylene glycol dibenzoate (Example C-1).

The Brookfield viscosity, fusion and gel properties of the two compositions were determined and are set forth in Table I. The Brookfield viscosity was determined for 1 hour and 24 hours at 2.5 revolutions per minute (RPM) and 20 RPM. The viscosity values are centipoise, the fusion and gel time is given in minutes:seconds, fusion and gel temperature is given in ° F./° C., fusion and gel torque is given in meters *gram

TABLE I

|  | Example | |
| --- | --- | --- |
|  | C-1 | 1 |
| Brookfield Viscosity |  |  |
| 1 hour @ 2.5 RPM | 3680 | 2240 |
| 1 hour @ 20 RPM | 2400 | 1700 |
| 24 hours @ 2.5 RPM | 7450 | 6650 |
| Fusion Time | 18:00 | 18:23 |
| Fusion Temp | 266/130 | 269/131 |
| Fusion Torque | 815 | 761 |
| Gel Time | 8:45 | 9:11 |
| Gel Temp | 161/72 | 165/74 |
| Gel Torque | 11 | 11 |

Various physical properties for the two compositions were determined using the procedures described above. These physical properties are set forth in Table II. The values in parentheses are standard deviations.

TABLE II

|  | Example | |
| --- | --- | --- |
|  | C-1 | 1 |
| Tensile Strength, MPa | 8.6(2.1) | 12.4(1.4) |
| Modulus at 100% Elong, MPa | 5.1(0.2) | 5.0(0.1) |
| Elongation at Brk, % | 198(64) | 345(53) |
| Shore A Hardness | 64(2) | 65(1) |
| Tear Resistance, kN/M | 40.7(3.9) | 43.8(2.3) |
| Specific Gravity, g/cm$^3$ | 1.205(0.003) | 1.1856(0.001) |
| Brittlenesss Temp, ° C. | −41 | −46 |
| Cottonseed Oil Extractionl, % loss | 21.3(0.6) | 17.9(0.9) |
| Hexane Extraction, % loss | 34.6(3.2) | 27.4(1.4) |
| 1% Soap Water Extraction, % loss | 2.9(0.5) | −0.2(0.2)* |
| Carbon Extraction, % loss | 2.5(0.1) | 5.5(1.3) |

Example 2 and Comparative Examples C-2 and C-3

Using the above-described procedure, three compositions were prepared from a 70:30 by weight mixture of 2 different PVC resins: 70 parts Oxy 6547 resin and 30 parts Oxy 625 resin, 70 PHR plasticizer, 3 PHR epoxidized soybean oil (Drapex 6.8) and 2 PHR of a mixed metal stabilizer (Akcrostab 4398 supplied by Akcros Chemical). The Oxy230 PVC powder has an internal viscosity IV of 0.95 and a molecular weight factor K of 68. In the first composition, the plasticizer was DBTP (Example 2); in the second composition, the plasticizer was diethylene glycol dibenzoate (Example C-2); and in the third composition, the plasticizer was butyl benzyl phthalate (Example C-3).

The Brookfield viscosity, fusion and gel properties of the two compositions were determined and are set forth in Table III. The Brookfield viscosity was determined for 1 hour and 24 hours at 2.5 RPM and 20 RPM. The viscosity values are centapoise, the fusion and gel time is given in minutes:seconds, fusion and gel temperature is given in ° F./° C., fusion and gel torque is given in meters *gram

TABLE III

|  | Example | | |
| --- | --- | --- | --- |
|  | 2 | C-2 | C-3 |
| Brookfield Viscosity |  |  |  |
| 1 hour @ 2.5 RPM | 1650 | 2550 | 1950 |
| 1 hour @ 20 RPM | 1368 | 2531 | 1837 |
| 24 hours @ 2.5 RPM | 3300 | 5400 | 3000 |
| 24 hours @ 20 RPM | 2493 | 4800 | 2625 |
| Fusion Time | 10:09 | 10:02 | 10:12 |
| Fusion Temp | 178/81 | 176/80 | 179/82 |
| Fusion Torque | 821 | 956 | 857 |
| Gel Time | 5:42 | 5:17 | 6:20 |
| Gel Temp | 126/52 | 120/49 | 133/56 |
| Gel Torque | 5 | 5 | 5 |

Various physical properties for the three compositions were determined using the procedures described above. These physical properties are set forth in Table IV.

TABLE IV

|  | Example | | |
| --- | --- | --- | --- |
|  | 2 | C-2 | C-3 |
| Tensile Strength, MPa | 11.7(0.4) | 14.6(0.4) | 15.7(1.1) |
| Modulus at 100% Elong, MPa | 4.5(0.5) | 5.3(0.1) | 5.4(0.2) |
| Elongation at Break, % | 361(36) | 401(10) | 383(18) |
| Shore A Hardness | 53(3) | 67(1) | 56(4) |
| Tear Resis, kN/M | 32.9(2.6) | 43.1(1.6) | 41.0(4.4) |
| Specific Gravity, g/cm$^3$ | 1.228(0.009) | 1.292(0.001) | 1.278(0.006) |
| Tear Force, N | 45(10) | 31(6) | 53(9) |
| Brittleness Temp, ° C. | −45 | −24 | −28 |

Example 3 and Comparative Example C-4

Using the above-described procedure, two compositions were prepared from a 80:20 by weight mixture of 2 different PVC resins: 80 parts Oxy 75HC resin and 20 parts Oxy 625 resin, 60 PHR plasticizer, 3 PHR epoxidized soybean oil (Drapex 6.8) and 2 PHR of a mixed metal stabilizer (Akrostab 4398), In the first composition, the plasticizer was DBTP (Example 3) and in the second composition, the plasticizer was butyl benzyl phthalate (Example C-4).

The Brookfield viscosity, fusion and gel properties of the two compositions were determined and are set forth in Table V. The Brookfield viscosity was determined for 1 hour at 2.5 RPM and 20 RPM. The viscosity values are centipoise, the fusion and gel time is given in minutes:seconds, fusion and gel temperature is given in ° F./° C., fusion and gel torque is given in meters *gram

TABLE V

|  | Example | |
| --- | --- | --- |
|  | 3 | C-4 |
| Brookfield Viscosity | | |
| 1 hour @ 2.5 RPM | 3920 | 4720 |
| 1 hour @ 20 RPM | 1880 | 2990 |
| Fusion Time | 7:56 | 8:04 |
| Fusion Temp | 163/73 | 161/72 |
| Fusion Torque | 2033.4 | 1821.0 |
| Gel Time | 4:43 | 5:23 |
| Gel Temp | 119/48 | 126/52 |
| Gel Torque | 16 | 15 |

Various physical properties for the two compositions were determined using the procedures described above. These physical properties are set forth in Table VI.

TABLE VI

|  | Example | |
| --- | --- | --- |
|  | Example 3 | Example C-4 |
| Tensile Strength, MPa | 14.51(1.067) | 16.62(1.512) |
| Modulus at 100% Elong, MPa | 4.48(0.068) | 5.65(0.150) |
| Elongation at Brk, % | 401.5(24.28) | 351.1(32.69) |
| Shore A Hardness | 61(2) | 60(2) |
| Tear Resistance, kN/M | 39.7(1.90) | 49.7(3.38) |
| Specific Gravity, g/cm³ | 1.2302(0.00251) | 1.2719(0.00322) |
| Tear Force, N | 45.1(3.33) | 39.3(4.55) |

TABLE VI-continued

|  | Example | |
| --- | --- | --- |
|  | Example 3 | Example C-4 |
| Cottonseed Oil Extraction, % loss | 3.5(0.3) | 1.6(0.4) |
| Hexane Extraction, % loss | 15(3) | 6(2) |
| 1% Soap Water Extraction, % loss | 0.70(0.02) | 0.64(0.30) |
| Carbon Extraction, % loss | 8.2(0.7) | 2.6(0.1) |

Example 4 and 5 and Comparative Example C-5

Using the above-described procedure, three compositions were prepared from a PVC resin (Oxy 240F), 50 PHR plasticizer, 2 PHR epoxidized soybean oil (Drapex 6.8) and 2 PHR of a mixed metal stabilizer (Across LT 4798. In the first composition, the plasticizer was a 75:25 by weight blend of DOTP and diethylene glycol dibenzoate (Benzoflex 2-45 from Velsicol) (Example C-5); in the second composition, the plasticizer was a 75:25 blend of DOTP and DBTP (Example 4); and in the third composition, the plasticizer was a 75:25 blend of DOTP and DIBTP (Example 5).

The fusion and gel properties of the three compositions were determined and are set forth in Table VII. The fusion and gel times are given in minutes:seconds, fusion and gel temperature is given in ° F./° C., fusion and gel torque is given in meters *gram

TABLE VII

|  | Example | | |
| --- | --- | --- | --- |
|  | Example C-5 | Example 4 | Example 5 |
| Fusion Time | 6:46 | 6:25 | 6:13 |
| Fusion Temp | 277/136 | 277/136 | 276/135 |
| Fusion Torque | 899 | 839 | 845 |
| Gel Time | 2:35 | 3:07 | 2:58 |
| Gel Temp | 263/128 | 264/129 | 265/129 |
| Gel Torque | 408 | 467 | 479 |

Various physical properties for the two compositions were determined using the procedures described above. These physical properties are set forth in Table VIII.

TABLE VIII

|  | Example | | |
| --- | --- | --- | --- |
|  | Example C-5 | Example 4 | Example 5 |
| Tensile Strength, MPa | 19.79(0.826) | 19.16(0.661) | 18.31(0.857) |
| Modulus at 100% Elong, MPa | 11.02(0.133) | 10.20(0.217) | 13.08(0.848) |
| Elongation at Brk, % | 307.7(30.58) | 327.0(20.70) | 197.0(12.15) |
| Shore A Hardness | 77(2) | 77(3) | 78(2) |
| Tear Force, N | 123.0(4.29) | 127.3(9.85) | 128.5(13.69) |

TABLE VIII-continued

| | Example | | |
|---|---|---|---|
| | Example C-5 | Example 4 | Example 5 |
| Tear Resistance, kN/M | 76.7(2.97) | 79.1(4.73) | 78.2(6.80) |
| Specific Gravity, g/cm$^3$ | 1.2516(0.00510) | 1.2376(0.00398) | 1.2358(0.00237) |
| Brittleness Temp, ° C. | −28 | −33 | −28 |
| 1% Soapy water extraction, % | Loss 0.42 | Gain 0.02 | Gain 0.04 |
| Cottonseed oil extraction, % | Loss 1.35 | Loss 1.58 | Loss 1.55 |
| Hexane extraction, % | Loss 5.69 | Loss 21.96 | Loss 21.50 |
| Carbon extraction, % | Loss 0.56 | Loss 1.52 | Loss 2.12 |

Example 6 and Comparative Examples C-6 and C-7

Using the above-described procedure, three compositions were prepared from a blend of PVC resins consisting of 91.4 parts by weight Oxy 80 HC PVC and 8.6 parts by weight PVC blending resin Oxy 567 (both supplied by Oxychem), 30 PHR plasticizer, 17 PHR TXIB (2,2,4-trimethyl-1,3-pentanediol diisobutyrate), 8 PHR mineral spirits, 3 PHR poly(ethylene glycol) 400 and 5 PHR of a mixed metal stabilizer (Akrostab 4798), In the first composition, the plasticizer was a mixed benzoate plasticizer blend (Benzoflex 6000 from Velsicol) (Example C-6); in the second composition, the plasticizer was butyl benzyl phthalate (Santicizer 160 supplied by Ferro (Example C-7); and in the third composition, the plasticizer was DBTP (Example 6). The plastisol were placed in a 508 micron (20 mil) mold and fused in oven at 20.4° C. (400° F.) for 2 minutes.

The compositions were evaluated for stain resistance by applying to (staining) the fused sheets prepared from the compositions brown color paste shoe polish, a 2 percent by weight solution of iodine in ethanol, and blue Magic Marker. The staining materials were allowed to remain on the fused sheets for periods of time of 1 hour and 24 hours and then were removed by rubbing with a cotton cloth and a cleaning solution. For both the shoe polish and marker, mineral spirits were used. For the Iodine, isopropanol followed by mineral spirits were used. The stains remaining on the fused sheets then were evaluated and rated according to the following rating system: 5=severe staining, 4=considerable staining, 3=moderate staining, 2=slight staining and 1=no staining. The results of the staining evaluations values for the 1-hour and 24-hour tests are set forth in Tables IX and X, respectively.

TABLE IX

| Staining Materials | Example C-6 | Example C-7 | Example 6 |
|---|---|---|---|
| Shoe Polish | 3 | 4 | 4 |
| Iodine | 3 | 4 | 3 |
| Blue Marker | 3 | 4 | 3 |

TABLE X

| Staining Materials | Example C-6 | Example C-7 | Example 6 |
|---|---|---|---|
| Shoe Polish | 3 | 4 | 4 |
| Iodine | 3 | 4 | 3 |
| Blue Marker | 3 | 4 | 3 |

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents. Moreover, all patents, patent applications, publications, and literature references presented herein are incorporated by reference in their entirety for any disclosure pertinent to the practice of this invention.

We claim:

1. A plastisol composition comprising a liquid phase comprising plasticizers, and a PVC resin dispersed in the liquid phase, wherein the plasticizers in the plastisol composition consist essentially of:
   a) di-butyl terephthalate, di-isobutyl terephthalate or a mixture thereof; and
   b) one or more compounds selected from the group consisting of dioctyl phthalate, di-2-ethylhexyl phthalate, diisooctyl phthalate, diisononyl phthalate, di-linear nonyl phthalate, linear nonyl, linear undecyl phthalate, diundecyl phthalate, diisodecyl phthalate, mixtures of phthalates having straight-chains in the range of $C_6$-$C_{10}$, $C_7$ linear phthalate, $C_9$ linear phthalate, $C_{11}$ linear phthalate, ditridecyl phthalate, undecyl dodecyl phthalate, di-(2-propylheptyl)phthalate, nonyl undecyl phthalate, 1,3-pentanediol, 2,2,4-trimethyl-, 3-(benzyl phthalate) isobutyrate, polyester phthalate, diallyl phthalate, n-butylphthalyl-n-butyl glycosate, dicapryl phthalate, butyl cyclohexyl phthalate, dicyclohexyl phthalate, butyl octyl phthalate, dioctyl terephthalate, di-2-ethylhexyl terephthalate, dioctyl adipate, di-2-ethylhexyl adipate, diisononyl adipate, diisooctyl adipate, diisodecyl adipate, ditridecyl adipate, dibutoxyethyl adipate, dibutoxyethoxy adipate, n-octyl, n-decyl adipate, polyester adipate, poly glycol adipates, trioctyl trimellitate, tri-2-ethylhexyl trimellitate, triisooctyl trimellitate, triisononyl trimellitate, triisodecyl trimellitate, tri-n-hexyl trimellitate, dioctyl azelate, di-2-ethylhexyl glutarate, di-2-ethylhexyl sebecate, dibutyl sebacate, dibutoxyethyl sebecate, triethyl citrate, acetyl triethyl citrate, tri-n-butyl citrate, acetyltri-n-butyl citrate, acetyltri-n-hexyl citrate, n-butyl tri-n-hexyl citrate, isononyl benzoate, isodecyl benzoate, 1,4 cyclohexane dimethanol dibenzoate, 2,2,4 trimethyl-1,3 pentane diol dibenzoate, 2,2,-dimethyl-1,3 propanediol dibenzoate, $C_{10}$-$C_{21}$ alkane phenol esters, alkyl sulphonic phenol esters, reaction products of fully hardened castor oil, pentaerythritol tetrabenzoate, glycerol tribenzoate, polypropylene glycol dibenzoate, or triarylphosphates with acetic acid, polymers that are formed by the polymerization of glycols with one or more of adipic acid, phthalic acid, and sebecic acid (and that are optionally acid terminated), butyl benzyl phthalate, alkyl benzyl phthalates, phthalates having a butyl group and a $C_7$-$C_9$ group, diethylene glycol dibenzoate, di propylene glycol dibenzoate, 2-ethylhexyl benzoate, 2,2,4-trimethyl-1,3 pentanediol monoisobutyrate monobenzoate, ethylene glycol dibenzoate, propylene glycol dibenzoate, triethylene glycol dibenzoate, di-heptyl phthalate, dihexyl phthalate, dimethyl phthalate, diethyl phthalate, dibutyl phthalate, diisobutyl phthalate, 2,2,4-trimethyl-1,3-pentanediol diisobutyrate or combinations of two or more of the foregoing; and wherein the di-butyl terephthalate, di-isobutyl terephthalate or mixture thereof constitute at least about 10 weight percent of the total plasticizer present in the composition.

2. The plastisol composition of claim 1, wherein the amount of plasticizers present in the composition is from about 20 to 800 parts plasticizers per 100 parts PVC resin.

3. The plastisol composition of claim 1, wherein the amount of plasticizers in the composition is from about 40 to 120 parts plasticizers per 100 parts PVC resin.

4. The plastisol composition of claim 1, wherein the PVC resin has a degree of polymerization between 650 and 1600 and an inherent viscosity between 0.5 and 1.4 based on ASTM D-1243.

5. The plastisol composition of claim 1, wherein the composition further comprises one or more additional components selected from stabilizers, anti-static agents, anti-fogging agents, ultra-violet inhibitors, anti-oxidants, light stabilizers, fire retardants, pigments, or combinations of two or more of the foregoing.

6. A method for making a solid polyvinyl chloride composition comprising applying heat to the plastisol composition of claim 1 under conditions effective to fuse the plastisol composition.

7. A solid polyvinyl chloride composition made by the method of claim 6.

8. An article comprising the solid polyvinyl chloride composition of claim 7.

9. The article of claim 8, wherein the article is an adhesive, a sealant, a coated fabric, a wire coating, a cable coating, a foam, a footwear, a gasket, an ink, a cosmetic, a medical device, a floor covering, a wallpaper, a roofing membrane, tubing or a calendared film.

10. A plastisol composition comprising a liquid phase comprising plasticizers, and a PVC resin dispersed in the liquid phase, wherein the plasticizers in the plastisol composition consist essentially of:
a) di-butyl terephthalate, di-isobutyl terephthalate or a mixture thereof and
b) one or more compounds selected from dioctyl terephthalate, diisooctyl phthalate, di-2-ethylhexyl phthalate, di-2-ethylhexyl terephthalate, tri-2-ethylhexyl trimellitate, di-2-propylheptyl phthalate, diisononyl phthalate, diisodecyl phthalate, diisoundecyl phthalate, ditridecyl phthalate, trioctyl trimellitate, triisononyl trimellitate, 2,2,4-trimethyl-1,3-pentanediol diisobutyrate, isononyl benzoate, isodecyl benzoate, or combinations of two or more of the foregoing; and wherein the di-butyl terephthalate, di-isobutyl terephthalate or mixture thereof constitute at least about 10 weight percent of the total plasticizer present in the composition.

11. The plastisol composition of claim 10, wherein the amount of plasticizers in the composition is from about 40 to 120 parts plasticizers per 100 parts PVC resin.

12. The plastisol composition of claim 10, wherein the plasticizers consist essentially of:
a) di-butyl terephthalate, and
b) one or more compounds selected from di 2-ethylhexyl terephthalate, diisooctyl phthalate, di-2-ethylhexyl phthalate, di-2-propylheptyl phthalate, diisononyl phthalate, diisodecyl phthalate, diisoundecyl phthalate, ditridecyl phthalate, tri-2-ethylhexyl trimellitate, triisononyl trimellitate, 2,2,4-trimethyl-1,3-pentanediol diisobutyrate, isononyl benzoate, isodecyl benzoate, or combinations of two or more of the foregoing.

13. The plastisol composition of claim 12, wherein the amount of plasticizers in the composition is from about 40 to 120 parts plasticizers per 100 parts PVC resin.

14. A method for making a solid polyvinyl chloride composition comprising applying heat to the plastisol composition of claim 10 under conditions effective to fuse the plastisol composition.

15. A solid polyvinyl chloride composition made by the method of claim 14.

16. An article comprising the solid polyvinyl chloride composition of claim 15.

17. The article of claim 16, wherein the article is an adhesive, a sealant, a coated fabric, a wire coating, a cable coating, a foam, a footwear, a gasket, an ink, a cosmetic, a medical device, a floor covering, a wallpaper, a roofing membrane, tubing or a calendared film.

* * * * *